United States Patent [19]

Harding et al.

[11] Patent Number: 4,584,033

[45] Date of Patent: Apr. 22, 1986

[54] METHOD OF QUENCHING

[75] Inventors: Ronald H. Harding, Westport, Conn.; Paul L. Matlock, Ossining, N.Y.

[73] Assignee: Union Carbide Corporation, Danbury, Conn.

[21] Appl. No.: 749,782

[22] Filed: Jun. 28, 1985

[51] Int. Cl.$^4$ .................. B23K 35/24; C21D 1/56
[52] U.S. Cl. .................. 148/14; 148/18; 148/20.6; 148/28
[58] Field of Search .................. 148/14, 18, 20, 28

[56] References Cited

U.S. PATENT DOCUMENTS

| | | | |
|---|---|---|---|
| 3,022,205 | 2/1962 | Chase | 148/20.6 |
| 3,220,893 | 11/1965 | Blackwood et al. | 148/28 |
| 3,475,232 | 10/1969 | Lewis et al. | 148/18 |
| 4,087,290 | 5/1978 | Kopietz et al. | 148/18 |
| 4,381,205 | 4/1983 | Warchol | 148/18 |
| 4,404,044 | 9/1983 | Warchol | 148/18 |
| 4,486,246 | 12/1984 | Warchol | 148/18 |
| 4,528,044 | 7/1985 | Warchol | 148/18 |

Primary Examiner—Veronica O'Keefe
Attorney, Agent, or Firm—Karen E. Klumas

[57] ABSTRACT

A method of quenching which comprises the steps of (a) immersing a metal heated to an elevated temperature in a quenchant composition comprising an aqueous solution of a sufficiently hydrophilic water-soluble or water-dispersible organic polymer of the formula:

$$Y[AR]_x$$

to provide a solution containing 15.0 weight percent of polymer and a balance of water with a Drag Out Value of less than about 40, preferably less than about 35 and most preferably less than about 25 under Standard Conditions; wherein Y is the residue of an active hydrogen-containing organic copound following active hydrogen removal;

x is an integer having a value of at least 1; wherein for values of x greater than 1 each AR segment of the polymer is the same or different;

A is a random or block polyoxyalkylene residue having units derived from ethylene oxide and at least one other lower alkylene oxide having 3 or 4 carbon atoms; and R is hydrogen or an hydrolytically stable organic moiety;

wherein for values of x greater than 1 each AR segment of the polymer is the same or different; with the proviso that R is only hydrogen or an organic moiety less hydrophobic than propane either when x is 1 and Y is at least as hydrophobic as hexane or when x is greater than 1 and at least one other R, individually or in combination is sufficiently hydrophobic to depress the cloud point of a 10% by weight aqueous solution of the corresponding $Y[AR]_x$, wherein R is hydrogen, by 10° F.; and (b) removing the metal from the quenchant when a desired low temperature is reached.

21 Claims, 1 Drawing Figure

METHOD OF QUENCHING

BACKGROUND OF THE INVENTION

This invention relates to a method of quenching a variety of metals, particularly steel, using a more oil-like aqueous quenchant composition which provides desirably slow cooling rates at temperatures between about 300° C. and 200° C. and which retains sufficient polymer after extended periods of use to be considered mechanically stable.

Quenching is a process whereby a metal workpiece heated to a given elevated temperature is rapidly cooled by immersion in a quench bath containing compositions having a high heat-extracting potential such as water, brines, oils or polymer solutions. The rate of cooling as a function of time is described by means of a "cooling curve". Cooling curves are dependent on such factors as the size, shape and composition of the workpiece being quenched as well as the composition, concentration, degree of circulation and temperature of the quench bath.

Quenching typically takes place in three distinct stages each of which is dominated by a different mechanism of heat transfer. The initial quenching stage involves the formation of a continuous vapor blanket around the workpiece surface. The cooling rate at this first stage is usually relatively slow, the vapor blanket functioning as an insulating medium around the workpiece surface. As the temperature of the workpiece surface is reduced, the vapor blanket collapses and a second cooling stage, characterized by the relatively rapid formation at the workpiece surface of discrete, heat removing vapor bubbles, is initiated. When the temperature of the workpiece surface is further reduced, a slower cooling period termed the "liquid cooling stage" or "C-stage" occurs. C-stage cooling for ferrous metals generally takes place at temperatures below about 300° C. which corresponds approximately with most hardenable alloys' Martensitic Transformation Start ($M_s$) temperature range of about 200° C. to 300° C. The rate of C-stage cooling typically has a significant effect on the physical characteristics of the workpiece quenched and thus is of particular interest.

In general, a quench bath is rated according to its ability to impart good physical properties to steel. Steel heated to temperatures in excess of about 800° C. usually has what is termed an austenite microstructure. During quenching this austenite structure may be transformed into a variety of other structures such as ferrite, pearlite, bainite and martensite. Of the various structures, ferrite is the softest and most ductile, whereas, martensite is the hardest formation.

Austenite transformation to ferrite takes place at the high temperature end of a cooling curve, typically at temperatures below about 800° C., whereas, austenite transformation to martensite takes place at the low temperature end of the curve, typically at temperatures below about 300° C. Rapid cooling of a workpiece to about that metal's $M_s$ value minimizes the transformation of austenite to softer microstructure and maximizes the transformation of austenite to martensite, resulting in a structure of maximum hardness.

Cooling rates are not uniform throughout a workpiece; surface regions are better able to dissipate heat and thus cool faster than interior regions. The difference in cooling rates gives rise to stress-inducing temperature gradients within the workpiece itself. Workpieces subjected to rapid cooling to temperatures of about 300° C. are susceptible to warping or cracking as a result of temperature induced stress.

Gradual cooling is a means of relieving thermal stress. Martensite is more susceptible to cracking or distortion as a result of temperature induced stress than are softer, more ductile microstructures. Slow cooling below a temperature of about 300° C. is, therefore, especially critical when a workpiece contains a high percentage of martensite microstructure. Although it may be desirable to maximize the degree of martensite formation in a workpiece by rapid cooling to a temperature of about 300° C., in order to promote cracking and distortion resistance, it is desirable that the overall cooling rate of the workpiece slow abruptly at about this temperature and proceed slowly until quench completion. At temperatures below about 200° C. cooling rates tend to equalize, thus, the cooling rates provided by various quenchant compositions in the critical region of from about 300° C. to about 200° C. are of particular interest.

Water or brine quench baths provide very rapid cooling through the entire quench temperature range. The inability of these baths to provide desirably slow cooling rates at lower temperatures generally increases the cracking and distortion potential of metals quenched therein. Oil baths typically provide a desirably slow cooling rate at low temperatures, however, lack water's ability to provide initial rapid cooling. As a result, oil quenched metals generally do not attain the hardness that is associated with metals quenched in water or brine baths. Additionally, oil baths tend to deteriorate with use and require periodic replacement. Moreover, the relatively low flash points of most oils creates a significant fire and safety hazard in their use as a quenchants. Efforts to develop a quenchant composition having the rapid, high temperature quenching characteristics of water and brines, and the slow, low temperature quenching ability of oils have led to work with aqueous solutions or dispersions of various organic polymers.

U.S. Pat. No. 3,022,205 discloses an aqueous quenchant medium containing between 0.2 g and 4.5 g, per gallon of water, of an ethylene oxide polymer having a molecular weight of between 100,000 and several million.

U.S. Pat. No. 3,220,893 discloses a metal quenchant medium containing an aqueous solution of an oxyalkylene polymer containing both oxyethylene units and higher molecular weight oxyalkylene units such as units derived from propylene oxide. The polymers are further described as having an oxyethylene to oxyalkylene ratio by weight of from about 70:30 to about 90:10, and an average molecular weight of from 600 to 40,000. The specific polymer exemplified is a polyglycol containing 75 percent by weight of oxyethylene units and 25 percent by weight of oxypropylene units, having a viscosity of about 90,000 Saybolt seconds at 100° F. and an average molecular weight of from about 12,000 to about 14,000.

U.S. Pat. No. 3,475,232 discloses an aqueous quenchant containing a normally liquid water soluble oxyalkylene polymer having oxyethylene and higher molecular weight oxyalkylene units, and a water soluble alcohol selected from the group consisting of glycerol, glycols containing from 2 to 7 carbon atoms, and mono-lower alkyl ethers of said glycols in which the alkyl group contains from 1 to 4 carbon atoms. A polymer comprising about 75 percent by weight of oxyethylene units and about 25 percent by weight of oxypropylene units, having a viscosity of about 150,000 Saybolt seconds at 100° F. is particularly preferred.

U.S. Pat. No. 4,381,205 discloses a metal quenching process using an aqueous quenchant bath containing from about 0.5 to about 50% by weight of the bath, of a liquid, water-soluble or water dispersible capped polyether polyol. The polyol is characterized as having a molecular weight of from about 7,000 to about 15,000, and is obtained by reacting ethylene oxide and at least one alkylene oxide having 3 to 4 carbon atoms with an active hydrogen compound to prepare a heteric or block copolymer, and further reacting the copolymer with a $C_{12}$ to $C_{30}$ alpha-olefin oxide. Preferred polyols are polyoxyethylene/polyoxypropylene block copolymers containing from about 65 to about 80% by weight of ethylene oxide derived units and from about 35% to about 20% by weight of 1,2-polypropylene oxide derived units, wherein the polyol is further capped with a $C_{16}$ alpha-olefin oxide. The patent states that ". . . the capped polyether polyols used in the quenching bath of the novel process of this invention reduce the rate of cooling significantly as compared to the same polyether polyols which are uncapped . . . ".

Although the $C_{16}$ alpha-olefin oxide capped polyoxyalkylene polymer-containing quench baths of U.S. Pat. No. 4,381,205 provide desirably slow low temperature cooling rates to metals quenched therein, the baths exhibit undesirable levels of foaming and are rapidly depleted of polymer which tends to be selectively lost from solution as a film or coating on quenched materials.

A polyoxyalkylene polymer suitable for use in a quenchant medium which provides a desirable rate of cooling at temperatures in the 300° C. to 200° C. region without contributing to adverse bath foaming, further characterized as being resistant to the selective loss of polymer from solution, hereinafter referred to as "dragout", is desired.

Definitions

For purposes of defining this invention the following definitions shall apply.

Standard Conditions—The conditions of the repeat quench test hereinafter defined.

Repeat Quench Test—The following test procedure:

An 32 inch (80 cm) low carbon steel rod ⅝ (15.9 mm) inch in diameter is subjected to 5 minutes of heating in an 845° C. furnace in order to reach a surface temperature of about 750° C. to 800° C. Following heating, the rod is immersed to a depth of about 8 inches (20 cm) in 2500 ml of polymer solution contained in a 12 inch (30 cm) cylindrical vessel 4⅜ inch (11 cm) in diameter for a 2½ minute period. The rod is continuously cycled between the furnace and polymer solution for a series of 576 repetitions.

The temperature of the polymer solution is maintained at 43±5° C. by means of a water cooling jacket fitted to the containment vessel. The containment vessel is also equipped with a stirrer which operates continuously throughout the test. A foil cover on the containment vessel checks solution evaporation. A float-level control unit tied into a 4 liter reservoir of distilled water monitors the solution level of the containment vessel, maintaining same at a pre-set mark.

Drag Out Value—a measure of the selective loss of polymer from solution calculated according to the following formula:

$$\frac{100\,(\eta_D^{100}\text{initial} - \eta_D^{100}\text{aged})}{\eta_D^{100}\text{initial} - \eta_D^{100}\text{water}}$$

where $\eta_D^{100}$ initial is the refractive index of the initial polymer solution, $\eta_D^{100}$ aged is the refractive index of the polymer solution at the expiration of the Repeat Quench Test, and $\eta_D^{100}$ water is the refractive index of water, wherein all refractive indices are measured at a temperature of 100° F.

C-Stage Cooling—The relatively slow convective cooling which follows the rapid heat removing nucleate boiling B-stage of the quenching process. For ferrous metals C-stage cooling refers to the rate of cooling which takes place at the $M_s$ temperature range of from about 300° C. to about 200° C.

Cooling Rate Test—A 1½ inch (38.1 mm) type 303 stainless steel rod 1 inch (25.4 mm) in diameter is fitted through the center with a type K, shielded, chromelalumel thermocouple, positioned from the upper end of the rod through the length of the rod a distance ⅝ inch (15.9 mm) from the center of the rod's opposite end. The rod thermocouple is connected to a recorder set to report data at the rate of 5 points per second. The rod is heated to an initial temperature of 1550° F. (843.5° C.), and is then immersed in 2500 ml of circulated polymer solution contained in a 4 inch (10 cm) stainless steel quench pot 3 inches (7.6 cm) in diameter for a period of 100 seconds. During immersion the temperature as a function of time is recorded. The solution temperature is maintained at a predetermined temperature in a range of about 40° C. to 60° C. A mechanical pump provides continuous controlled circulation past the probe at a rate of about 6 gallons (22.7 liters) per minute during the course of the test.

Water-Soluble Polymer—A polymer having a solubility of at least 15 weight percent in water at 25° C.

Water-Dispersible Polymer—a polymer forming stable, uniform dispersions with ordinary equipment at concentrations of from about 1 to at least 15 weight percent in 25° C. water.

SUMMARY OF THE INVENTION

Figure 1:
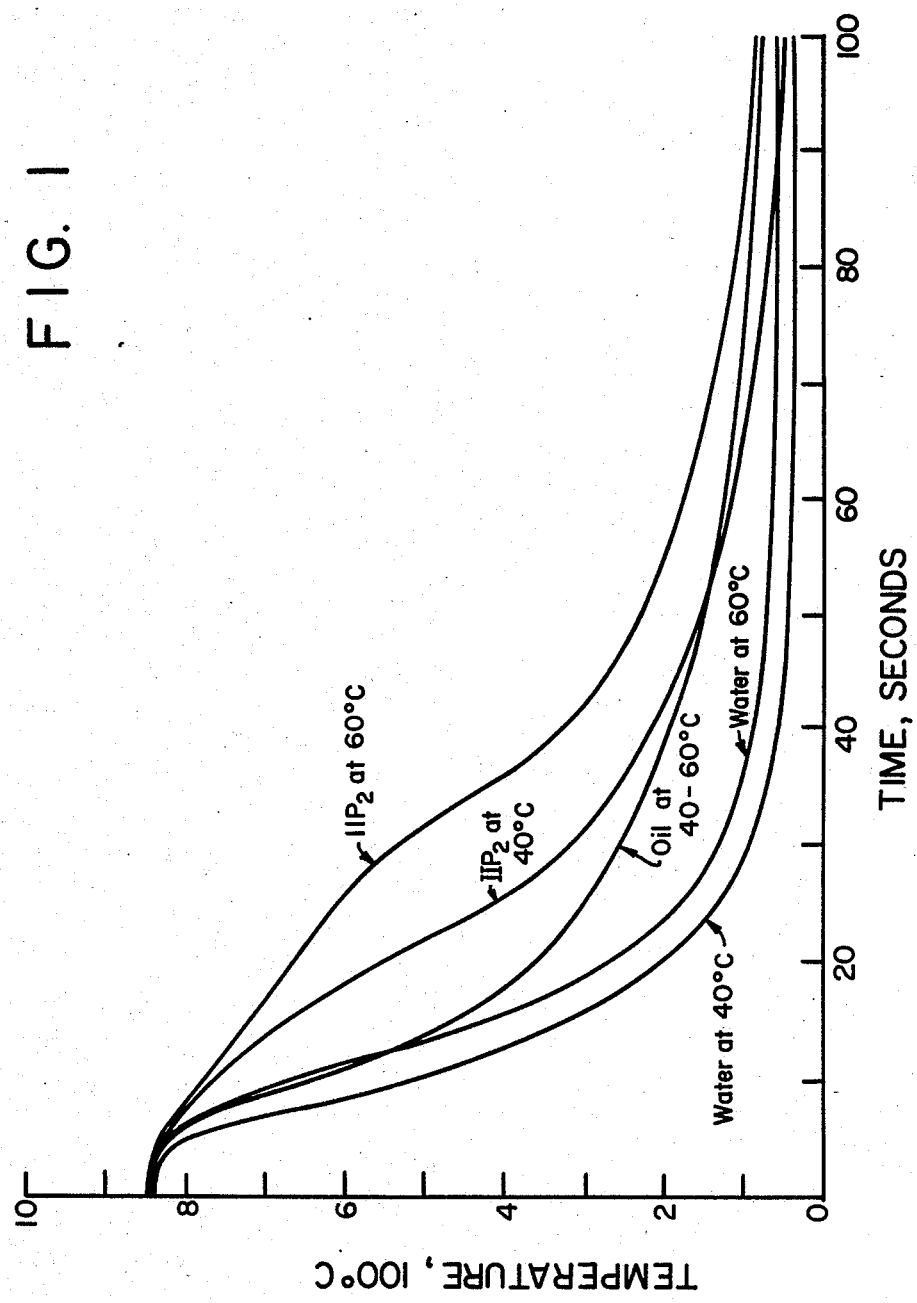
FIG. 1 is a graph showing the change in temperature as a function of time for oil, water and a 7.7 weight percent solution of an organic polymer prepared in accordance with the practice of this invention.

This invention is directed to a method of quenching which comprises the steps of (a) immersing a metal heated to an elevated temperature in a quenchant composition comprising an aqueous-solution of a sufficiently hydrophilic water-soluble or water-dispersible organic polymer of the formula:

to provide a solution containing 15.0 weight percent of polymer and a balance of water with a Drag Out Value of less than about 40, preferably less than about 35 and most preferably less than about 25 under Standard Conditions; wherein Y is the residue of an active hydrogen-containing organic compound following active hydrogen removal;

A is a random or block polyoxyalkylene residue having units derived from ethylene oxide and at least one other lower alkylene oxide having 3 or 4 carbon atoms;

R is hydrogen or a hydrolytically stable organic moiety; and x is an integer having a value of at least 1; wherein for values of x greater than 1 each AR segment of the polymer is the same or different; with the proviso that R is only hydrogen or an organic moiety less hydrophobic than propane either when x is 1 and Y is at least as hydrophobic as hexane or when x is greater than 1 and at least one other R, individually or in combination is sufficiently hydrophobic to depress the cloud point of a 10% by weight aqueous solution of the corresponding $Y[AR]_x$, wherein R is hydrogen, by about 10° F.; and (b) removing the metal from the quenchant when a desired low temperature is reached.

This invention is also directed to the above described quenchant composition.

DETAILED DESCRIPTION OF THE INVENTION

The distinctive characteristic of the polymers of this invention is the presence of at least one terminal hydrophobe, regardless of whether that hydrophobe is provided by the residue of a hydrophobic monohydric active hydrogen containing initiator, Y, one or more hydrophobic end groups, R, or both.

It has been found that the presence of a terminal hydrophobe segment may have a significant influence on the cooling rate behavior of quenchant compositions comprising aqueous solutions of polyoxyalkylene-containing polymers (i.e., polyether polyols). In general, the presence of a sufficiently hydrophobic terminal segment reduces the C-stage cooling rate provided by polyether polyol-containing quenchants. However, it has also been found that polymers having excessively hydrophobic terminal end groups oftentimes are excessively viscous for quenchant applications and tend to be selectively removed from solution on materials quenched therein at a rate which renders such polymers mechanically unstable for quenchant applications. By this invention, polymers capable of providing quenchant compositions with desirable C-stage cooling rates and acceptable Drag Out Values are provided.

Polymers having at least one R as hydrophobic as propane are termed "hydrophobe capped polymers". In a preferred embodiment, this invention relates to a hydrophobe capped polymer wherein all Rs are at least as hydrophobic as propane. In another embodiment this invention relates to hydrophobe capped polymers having at least one hydrophobic end group R, which individually or in combination with at least one other R is sufficiently hydrophobic to reduce the cooling rate at 300° C. of an aqueous solution comprising about 10.0 weight percent of the corresponding $Y[AR]_x$ wherein R is hydrogen, by at least 15%, preferably by at least 20% and most preferably by at least 35% as per the Cooling Rate Test previously described at a bath temperature of about 40° C.

The polymers of this invention generally have number average molecular weights in a range of from about 4,000 to about 25,000, preferably from about 8,000 to about 20,000, and most preferably from about 10,000 to about 15,000.

In the broadest sense, Y includes the residues of active hydrogen-containing compounds which are substantially identical to the polymers of this invention devoid of R groups, since compositions in virtually all stages of alkoxylation may be considered as potential initiators in producing the hydrophobe terminated polymers of this invention.

Y segments of the polymers of this invention include the residue of $C_1$ to $C_{24}$ preferably $C_1$ to $C_{16}$ and most preferably $C_1$ to $C_{12}$ monohydric alcohols having a primary, secondary and/or tertiary hydroxyl group, such as 1-butanol, 1-hexanol, 2-butanol, 2-hexanol and the like; $C_2$ to $C_{24}$ preferably $C_2$ to $C_{16}$, and most preferably $C_2$ to $C_{12}$ diols such as ethylene glycol, diethylene glycol, 1,4-butane diol, 1,6-hexane diol and the like; $C_3$ to $C_{24}$ preferably $C_3$ to $C_{16}$ and most preferably $C_3$ to $C_{12}$ polyols such as 1,1,1-trimethylol propane, glycerin, pentaerythritol, dipentaerythritol, and the like; amines such as ethanol amine, diethanol amine, dimethylethanol amine, triethanol amine, ethylene diamine and the like; polyglycerin having a molecular weight up to about 1800; alkyl phenols having at least one alkyl group, wherein the total number of alkyl carbon atoms ranges from about 2 to 16, preferably from about 6 to 10 and most preferably is 8 or 9, including compositions such as octyl phenol, nonyl phenol and the like; polyalkylene glycols of the formula:

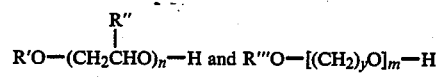

$$R'O-(CH_2CHO)_n-H \text{ and } R'''O-[(CH_2)_yO]_m-H$$

wherein R' and R''' are $C_1$ to $C_8$, preferably $C_2$ to $C_4$ alkyl groups, R'' is a $C_1$ or $C_2$ alkyl group, y is an integer having a value of 3 or 4, and n and m are integers from 2 to 20, preferably 4 to 12; and the like.

Organic compounds having at least 1, preferably 1 to 4 and most preferably 2 active hydrogen atoms are particularly well suited for producing the Y segments of the hydrophobe capped polymers of this invention.

Polymers are widely variable as regards the composition of a polyoxyalkylene chain A. The alkylene oxides which are reacted with a selected active hydrogen-containing compound to produce polymers having at least one polyoxyalkylene chain include ethylene oxide and at least one lower alkylene oxide having 3 or 4 carbon atoms such as 1,2-propylene oxide, 1,3-propylene oxide, 1,2-butylene oxide, 2,3-butylene oxide, 1,4-butylene oxide, and the like. Polyoxyalkylene chains containing units derived from ethylene oxide and 1,2-propylene oxide and/or 1,2-butylene oxide are particularly desired. For convenient disposal, clean-up and handling it is desirable that the polyoxyalkylene-containing polymers of this invention contain sufficient ethylene oxide derived units to provide a water-dispersible or water-soluble polymer. In general, a chain may comprise from about 60 to about 90 percent by weight, of ethylene oxide derived units and from about 40 to about 10 percent by weight, of units derived from at least one other lower alkylene oxide. A polyoxyalkylene chain comprising from about 75 to about 85 percent by weight, of ethylene oxide derived units and from about 25 to about 15 percent by weight of units derived from at least one other lower alkylene oxide is preferred. When Y is itself alkoxylated, the limitations provided with respect to A apply to what is termed the polyoxyalkylene portion of the polymer, i.e. entire polyoxyalkylene segments exclusive of R groups, regardless of whether the individual oxyalkylene derived units are considered as belonging to Y or A.

Polyoxyalkylene chains are also widely variable in length. Excessively long polyoxalkylene chains oftentimes produce viscous polymers which tend to be rapidly depleted from quench baths, whereas, excessively short chains may result in polymers which are unable to provide desired quench rates. Typically a polymer contains a sufficient number of oxyalkylene units in one or more oxyalkylene chains to provide the polymer with a Saybolt Universal viscosity at 100° F. of from about 5,000 seconds to about 500,000 seconds, preferably from about 10,000 seconds to about 400,000 seconds and most preferably from about 10,000 seconds to about 300,000 seconds.

The R groups of the polymers of this invention include hydrogen, and hydrolytically stable organic moieties. Since polymers of this invention require the presence of at least one terminal hydrophobe, R may only be hydrogen or an organic moiety less hydrophobic than propane either when x is 1 and Y is at least as hydrophobic as hexane or when x is greater than 1 and at least one other R, individually or in combination, provides the polymer with the requisite degree of hydrophobicity (i.e. R individually or in combination is sufficiently hydrophobic to depress the cloud point of a 1 % by weight aqueous solution of the corresponding $Y[AH]_x$ by about 10° F.). When R is an organic moiety, R includes $C_1$ to $C_{24}$ alkyl groups, at least one $C_2$ to $C_{12}$ alkylene oxide derived unit, and the like. $C_2$ to $C_{12}$ alkylene oxides include compounds such as 1,2-propylene oxide, 1,3-propylene oxide, 1,4-butylene oxide, 1,2-butylene oxide, 2,3-butylene oxide and the like.

For purposes of this invention, an organic moiety, R, is considered to be hydrophobic, i.e. having a degree of hydrophobicity at least as great as that of propane, or non-hydrophobic, i.e. having a degree of hydrophobicity less than that of propane. In determining the hydrophobicity of oxyalkylene derived end groups an oxypropylene derived unit may generally be considered to be approximately as hydrophobic as a unit corresponding to the formula —$CH_2$— in an alkane chain. For example, an end group comprising a single unit derived from 1,2-propylene oxide is considered to be a non-hydrophobic organic moiety, whereas, an end group derived from 3 or more units of 1,2-propylene oxide is considered to be a hydrophobic moiety.

Polymers of this invention may contain from about 0 to about 20, preferably from about 1 to about 15 and most preferably from about 3 to about 10 percent by weight of $C_3$ to $C_{12}$ alkylene oxide derived units in one or more terminal end groups R.

In an especially preferred embodiment the polymer of this invention has a Saybolt viscosity at 100° F. of from about 150,000 to about 250,000, Y is the residue of a $C_2$ to $C_8$ diol, preferably ethylene glycol, A is a random polyoxyalkylene chain comprising from about 75 to about 85 weight percent of ethylene oxide derived units and from about 25 to about 15 weight percent of 1,2-propylene oxide derived units, and R is an organic moiety more hydrophobic than propane comprising capping units derived from propylene oxide and/or butylene oxide, wherein the capping units comprise from about 2 to about 8 percent of the total weight of the polymer.

The polymers may be produced by various methods of preparation such as are disclosed in U.S. Pat. Nos. 4,381,205, 4,288,639 and 3,220,893 incorporated herein by reference.

Typically, the polymers are prepared by contacting ethylene oxide and at least one other lower alkylene oxide with a selected initiator at a temperature of from about 80° C. to about 150° C., preferably from about 100° C. to about 115° C. to produce an alkoxylated product. The preparation may be conducted at any pressure convenient for reaction. Preferably the reaction is conducted at pressures of from about 14 to about 150 psig, most preferably from about 60 to about 100 psig. The reaction may be conducted in the presence of a solvent including volatile hydrocarbons such as toluene, but is usually carried out neat. The reaction is generally carried out in the presence of a catalyst including basic catalysts such as potassium hydroxide or sodium hydroxide, Lewis acid catalysts such as $BF_3$; and the like. When producing polymers having alkylene oxide derived terminal end groups, upon completion of the initial alkoxylation reaction and the selected $C_2$ to $C_{12}$ alkylene oxide is added to the reaction mixture and the reaction continued to terminate the polymers with the desired alkylene oxide derived end groups. When R is an alkyl group, conventional methods such as dehydroformylation, Willamson synthesis and the like may be used to terminate a polyoxyalkylene containing compound with an alkyl group.

The quenchant compositions are typically available as concentrates which may be diluted to a wide range of concentrations depending on a particular application. The polymer concentration of the composition in use as a bath may range from about 1 to about 20 percent by weight, based on the total weight of the bath, with polymer concentrations of from about 2 to about 15 percent by weight being preferred. As a concentrate, a composition having from about 25 to about 60% by weight, based on the total weight of the bath, of polymer and a balance of water is preferred.

The quenchant compositions of this invention in use as baths are generally maintained at bath temperatures of from about 20° C. to about 80° C., with bath temperatures of from about 40° C. to about 60° C. being preferred.

Additional materials such as corrosion inhibitors, and/or buffers may also be present. Examples of suitable corrosion inhibitors are provided by compounds such as inorganic nitrites, soluble salts of fatty acids, a combination of an aromatic compound having at least one substituent nitro group and/or the water soluble organic or inorganic salts thereof and a hydroxy substituted mono aromatic carboxylic acid and/or in the water soluble organic or inorganic salts thereof. Buffers include compounds capable of maintaining the pH value of the composition in use in a range of from about 7.0 to 11.5 such as water soluble phosphates, borates, bicarbonates, borax, and the like.

EXAMPLES

The following serve to illustrate the specific embodiments of this invention. It is not intended that the scope of the invention shall be limited by these Examples.

POLYMER I

Into a one gallon reactor equipped with a nitrogen inlet, thermometer and stirrer were added 300 gms of a random polyethylene-polypropylene glycol starter containing 75 percent by weight of oxyethylene groups and 25 percent by weight of oxypropylene groups having an SUS viscosity of about 5,000 at 100° F. and 2.5 gms of powdered potassium hydroxide. The resultant mixture was stirred at a temperature of about 90° C. for a period of several hours to promote dissolution of the potassium hydroxide catalyst. Following heating the mixture was purged with nitrogen at 60 psi and the pressure of the reactor bled down to 15 psi. Thereafter, a series of successive reactions were conducted by adding incremental quantities of a previously prepared oxide mixture containing about 78 percent of ethylene oxide and about 22 weight percent of 1,2-propylene oxide to the reactor and heating the resultant mixtures to a temperature of 110° C. under a nitrogen atmosphere of 15 psi until each of the reactions was substantially complete. Following the individual reactions varying quantities of product were sampled and polymer viscosities measured.

After a product viscosity of about 189,000 SUS at 100° F. had been attained, all but 1978 grams of product (designated polymer $IP_1$) were removed from the reactor. Approximately 16.3 g of oxide mixture per gram of starter were reacted to produce polymer $IP_1$. The remaining 1978 grams of product were reacted to completion with 130 grams of 1,2-propylene oxide to produce a propylene oxide capped polymer (designated polymer $IP_2$) having a viscosity of 193,430 SUS at 100° F. All but 1455 g of this product were drained from the reactor and the remainder further reacted with 30 g of 1,2-propylene oxide to form polymer $IP_3$, having a viscosity of 188,800 SUS at 100° F.

POLYMER II

Into a five gallon reactor equipped with a nitrogen inlet, thermometer and stirrer were added 2,500 gms of a random polyethylene-polypropylene glycol starter containing 75 percent by weight of oxyethylene groups and 25 percent by weight of oxypropylene groups having an SUS viscosity of about 5,000 at 100° F. and 20.8 g of powdered potassium hydroxide. The resultant mixture was stirred at a temperature of about 90° C. for a period of approximately 6 hours to promote dissolution of the potassium hydroxide catalyst. Following heating the mixture was purged with nitrogen at 60 psi and the pressure of the reactor bled down to 20 psi. Thereafter, a series of successive reactions were conducted by adding incremental quantities of a previously prepared oxide mixture containing about 76 weight percent of ethylene oxide and about 24 weight percent of 1,2-propylene oxide to the autoclave and heating the resultant mixtures to a temperature of 110° C. under a nitrogen atmosphere of 20 psi until each of the reactions was substantially complete. Following the individual reactions varying quantities of product were sampled and viscosities measured.

After a product viscosity of about 226,000 SUS at 100° F. was attained, all but 21,215 grams of product, designated polymer $IIP_1$, were removed from the reactor. Approximately 10.9 g of oxide mixture per gram of starter were reacted to produce polymer $IIP_1$. The remaining 21,215 grams of product were reacted to completion with 1,350 grams of 1,2-propylene oxide to produce a propylene oxide capped polymer (designated $IIP_2$) having a viscosity of about 214,500 SUS at 100° F.

POLYMER III

Into a 1 gallon reactor equipped with a nitrogen inlet, thermometer and stirrer were added 350 g of a random polyethylene-polypropylene glycol starter containing 75 percent by weight of oxyethylene groups and 25 percent by weight of oxypropylene groups having an SUS viscosity of about 1,000 at 100° F. and 5.6 gms of powdered potassium hydroxide. The resultant mixture was stirred at a temperature of about 90° C. for a period of approximately 2 hours to promote dissolution of the potassium hydroxide catalyst. Following heating the mixture was purged with nitrogen at 60 psi and the pressure of the reactor bled down to 20 psi. Thereafter, a series of successive reactions were conducted by adding incremental quantities of a previously prepared oxide mixture containing about 86 weight percent of ethylene oxide and about 14 weight percent of 1,2-propylene oxide to the reactor and heating the resultant mixture to a temperature of 110° C. under a nitrogen atmosphere of 20 psi until each of the reactions was substantially complete. Following the individual reactions varying quantities of product were sampled and polymer viscosities measured.

After a product viscosity of 122,200 SUS at 100° F. was attained, all but 2,434 grams of product designated $IIIP_1$ were removed from the reactor. Approximately 9.4 grams of oxide mixture per gram of starter were reacted to produce polymer $IIIP_1$. The remaining 2,434 grams of product were reacted to completion with 230 grams of 1,2-propylene oxide to produce a propylene oxide capped polymer (designated $IIIP_2$) having a viscosity of 120,400 SUS at 100° F.

POLYMER IV

Into a 1 gallon reactor equipped with a nitrogen inlet, thermometer and stirrer were added 410 gms of a random polyethylene-polypropylene glycol starter containing 75 percent by weight of oxyethylene groups and 25 percent by weight of oxypropylene groups having an SUS viscosity of about 1,000 at 100° F. and 6.56 gms of powdered potassium hydroxide. The resultant mixture was stirred at a temperature of about 90° C. for a period of approximately 5 hours to promote dissolution of the potassium hydroxide catalyst. Following heating the mixture was purged with nitrogen at 60 psi and the pressure of the reactor bled down to 20 psi. Thereafter, a series of successive reactions were conducted by adding incremental quantities of a previously prepared oxide mixture containing about 86 weight percent of ethylene oxide and about 14 weight percent of 1,2-propylene oxide to the reactor and heating the resultant mixture to a temperature of 110° C. under a nitrogen atmosphere of 20 psi until each of the reactions was substantially complete. Following the individual reactions varying quantities of product were sampled and polymer viscosities measured.

After a product viscosity of 117,500 SUS at 100° F. was attained, all but 2,879 grams of product designated $IVP_1$ were removed from the reactor. Approximately 7.0 grams of oxide mixture per gram of starter were reacted to produce polymer $IVP_1$. The remaining 2,879 grams of product were reacted to completion with 73.8 grams of 1,2-butylene oxide to produce a butylene oxide capped polymer (designated $IVP_2$) having a viscosity of 121,200 SUS at 100° F. Thereafter, all but 1,483 grams of $IVP_2$ were drained from the reactor and the remainder further reacted with 38 g of 1,2-butylene oxide to form a butylene oxide capped polymer (designated $IVP_3$) having a viscosity of 115,200 SUS at 100° F.

POLYMER V

Into a one gallon reactor equipped with a nitrogen inlet, thermometer and stirrer were added 600 gms of a random polyethylene-polypropylene glycol containing 75 percent by weight of oxyethylene groups and 25 percent by weight of oxypropylene groups, having an SUS viscosity of about 5,000 at 100° F., and 3 g of powdered potassium hydroxide. The resultant mixture was stirred at a temperature of about 110° C. for a period of approximately 1 hour to promote dissolution of the potassium hydroxide catalyst. Following heating, the mixture was purged with nitrogen at 60 psi and the reactor bled down to a pressure of 20 psi. Thereafter, a series of successive reactions were conducted by adding incremental quantities of a previously prepared oxide mixture containing about 75 weight percent of ethylene oxide and about 25 weight percent of 1,2-propylene oxide to the reactor and heating the resultant mixtures to a temperature of 110° C. under a nitrogen atmosphere of 20 psi until each of the reactions was substantially complete. Following the individual reactions varying quantities of product were sampled and viscosities measured.

After a product viscosity of 101,649 SUS at 100° F. was attained, all but 2,523 grams of product designated $VP_1$ were removed from the reactor. Approximately 3.8 grams of oxide mixture per gram of starter were reacted to produce polymer $VP_1$. The remaining 2,523 grams of product were reacted to completion with 96 grams of 1,2-hexadecene oxide to produce a 1,2-hexadecene oxide capped polymer, designated $VP_2$, having a viscosity of about 100,000 SUS at 100° F.

EXAMPLES 1 TO 5 AND COMPARATIVE EXAMPLES $C_1$ AND $C_2$

The stability of several aqueous solutions of the previously prepared random oxyethylene-oxypropylene copolymers as a function of the ability of the copolymers to resist drag-out was measured by means of the Repeat Quench Test previously described.

Refractive index data and Drag Out Values obtained for samples of various polymer solutions are provided in Table I below.

TABLE I

| Example | Polymer | Polymer Concentration (Percent by Weight) | $\eta_D^{100}$ initial | $\eta_D^{100}$ final | Apparent Concentration of Polymer (By Refractive Index)[1] | Drag Out Value[2] |
|---|---|---|---|---|---|---|
| 1 | $IP_3$ | 7.5 | 1.3420 | 1.3393 | 11.2 | 24 |
| 2 | $IP_3$ | 10 | 1.3456 | 1.3406 | 13.0 | 34 |
| 3 | $IP_2$ | 10 | 1.3455 | 1.3422 | 15.4 | 22 |
| $C_1$ | $IIP_1$ | 10 | 1.3426 | 1.3418 | 18.6 | 5 |
| 4 | $IIP_2$ | 10 | 1.3422 | 1.3402 | 16.3 | 17 |
| 5 | $IIP_2$ | 12.5 | 1.3456 | 1.3414 | 17.7 | 28 |
| $C_2$ | $VP_2$ | 4 | 1.3367 | 1.3328 | 2.2 | 72 |

[1]Measured refractive index of water at 100° F. is 1.3313.
[2]It should be noted that Drag Out Values provided take into account a small correction for two solution samplings of 25 ml each. Following sampling, solution volume was made up by the addition of water.

EXAMPLES 6 TO 9 AND COMPARATIVE EXAMPLES $C_3$ TO $C_6$

The cooling-curve performance of oil, water and several aqueous solutions of random oxyethylene-oxyalkylene polymers was obtained by means of the Cooling Rate Test previously described. The cooling curves for oil, water, and a 7.7 weight percent solution of $II\ P_2$ at bath temperatures of 40° C. and 60° C. are provided in FIG. 1 attached hereto. Table II below provides the cooling rates, as determined by cooling curve data of oil, water, and polymer solutions at temperatures of 200°, 250° and 300° C., at bath temperatures over a range of 40° C. to 60° C.

TABLE II

| | | Concentration | Cooling Rate | | |
|---|---|---|---|---|---|
| Example | Polymer | (Percent by weight) | $-C°$/sec for $T_c = 300°$ C. | $-C°$/sec for $T_c = 250°$ C. | $-C°$/sec for $T_c = 200°$ C. |
| $C_3$ | Water | 0 | 28–25 | 22–20 | 17–15 |
| $C_4$ | Oil | 100 | 10 | 7 | 5 |
| $C_5$ | $IIIP_1$ | 10 | 25 | 20–19 | 14–13 |
| 6 | $IIIP_2$ | 10 | 16 | 12 | 8 |
| 7 | $IVP_3$ | 10 | 19 | 15–14 | 10 |
| $C_6$ | $IP_1$ | 7.5 | 22–19 | 17–15 | 12–11 |
| 8 | $IP_3$ | 7.5 | 14–13 | 11–10 | 8–7 |
| 9 | $IIP_2$ | 7.7 | 13–11 | 9–8 | 6–5 |

What is claimed is:

1. A method of quenching which comprises the steps of (a) immersing a metal heated to an elevated temperature in a quenchant composition comprising an aqueous solution of a sufficiently hydrophilic water-soluble or water-dispersible organic polymer of the formula:

$$Y[AR]_x$$

to provide a solution containing 15.0 weight percent of polymer and a balance of water with a Drag Out Value of less than about 40 under Standard Conditions; wherein
   Y is the residue of an active hydrogen-containing organic compound following active hydrogen removal;
   A is a random or block polyoxyalkylene residue having units derived from ethylene oxide and at least one other lower alkylene oxide having 3 or 4 carbon atoms;

R is hydrogen or a hydrolytically stable organic moiety; and x is an integer having a value of at least 1; wherein for values of x greater than 1 each AR segment of the polymer is the same or different; with the proviso that R is only hydrogen or an organic moiety less hydrophobic than propane either when x is 1 and Y is at least as hydrophobic as hexane or when x is greater than 1 and at least one other R, individually or in combination is sufficiently hydrophobic to depress the cloud point of a 10% by weight aqueous solution of the corresponding $Y[AR]_x$, wherein R is hydrogen, by about 10° F.; and (b) removing the metal from the quenchant when a desired low temperature is reached.

2. The method of claim 1 wherein at least one R is an organic moiety at least as hydrophobic as propane.

3. The method of claim 1 wherein the polymer contains from about 0 to about 20 percent by weight of $C_3$ to $C_{12}$ alkylene oxide derived units in one or more terminal end groups R.

4. The method of claim 2 wherein x is 1 or 2 and R is derived from at least one $C_3$ to $C_{12}$ alkylene oxide.

5. The method of claim 4 wherein the $C_3$ to $C_{12}$ alkylene oxide derived units in 1 or 2 terminal end groups R, comprise from about 1 to about 15 percent by weight of the polymer.

6. The method of claim 5 wherein the polymer has a Saybolt viscosity at 100° F. of from about 10,000 to about 400,000.

7. The method of claim 6 wherein A comprises from about 60 to about 90 percent by weight of ethylene oxide derived units and from about 40 to about 10 percent by weight of units derived from at least one other lower alkylene oxide having 3 or 4 carbon atoms.

8. The method of claim 3 wherein Y is the residue of an active hydrogen containing initiator selected from the group consisting of $C_1$ to $C_{24}$ aliphatic monohydric alcohols, diols and polyols, alkyl phenols having at least one alkyl group wherein the total number of alkyl carbon atoms ranges from about 2 to about 16, and polyalkylene glycols of the formula:

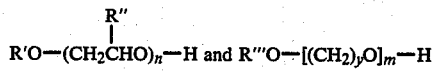

wherein R' and R''' are $C_1$ to $C_8$ alkyl groups, R'' is a $C_1$ or $C_2$ alkyl group, y is an integer having a value of 3 or 4 and n and m are integers from 2 to 20; and alkoxylation products of said initiators.

9. The method of claim 8 wherein the solution also comprises a corrosion inhibitor and/or buffer.

10. The method of claim 1 wherein the solution comprises from about 1 to about 20 percent by weight of polymer.

11. The method of claim 1 wherein the solution is maintained at a temperature of from about 20° C. to about 80° C.

12. The method of claim 1 wherein the polymer is a hydrophobe capped polymer having at least one hydrophobic end group, R, which individually or in combination with at least one other R is sufficiently hydrophobic to reduce the cooling rate at 300° C. of an aqueous solution comprising about 10.0 weight percent of the corresponding $Y[AR]_x$, wherein R is hydrogen, by about 20% as per the Cooling Rate Test at a bath temperature of about 40° C.

13. A method of quenching ferrous metals which comprises the steps of (a) immersing a workpiece heated to an elevated temperature in excess of about 800° C. in an aqueous solution comprising a sufficiently hydrophilic water-soluble or water dispersible polymer of the formula YAR to provide an aqueous solution containing 15.0 weight percent of polymer with a Drag Out Value of less than about 35 under standard conditions; wherein Y is the residue of an active hydrogen-containing organic compound selected from the group consisting of $C_6$ to $C_{24}$ aliphatic monohydric alcohols and alkyl phenols having at least one alkyl group wherein the total number of alkyl carbon atoms ranges from about 6 to about 10; A is a random or block polyoxyalkylene residue having units derived from ethylene oxide and at least one other lower alkylene oxide having 3 or 4 carbon atoms; and R is selected from the group consisting of hydrogen, and a hydrolytically stable organic moiety; and (b) removing the metal from the quenchant when a desired low temperature is reached.

14. The method of claim 13 wherein R is hydrogen or organic moiety less hydrophobic than propane.

15. The method of claim 13 wherein R is an organic moiety at least as hydrophobic as propane.

16. The method of claim 15 wherein the polymer has a Saybolt viscosity of 100° F. of from about 10,000 to 100,000.

17. The method of claim 16 wherein A has units derived from ethylene oxide, and 1,2-propylene oxide and/or 1,2-butylene oxide.

18. The method of claim 17 wherein R comprises from about 3 to about 10 percent by weight of the polymer.

19. A method of quenching metals which comprises the steps of (a) immersing a metal heated to a temperature in excess of about 800° C. in an aqueous solution comprising a sufficiently hydrophilic water-soluble or water-dispersible organic polymer of the formula:

to provide a solution containing 15.0 weight percent of polymer and a balance of water with a Drag Out Value of less than about 40 under Standard Conditions; wherein Y is the residue of a $C_1$ to $C_{24}$ diol;

A is a random polyoxyalkylene chain comprising from about 75 to about 85 weight percent of ethylene oxide derived units and from about 25 to about 15 weight percent of 1,2-propylene oxide derived units; and R is an organic moiety more hydrophobic than propane, comprising capping units derived from propylene oxide and/or butylene oxide, wherein the capping units comprise from about 6 to about 8 percent of the total weight of the polymer; and (b) removing the metal from the quenchant when a desired low temperature is reached.

20. The method of claim 19 wherein the polymer has a Saybolt viscosity of 100° F. of from about 150,000 to about 250,000.

21. The method of claim 20 wherein the solution contains from about 1 to about 20 weight percent of polymer, and also contains at least one corrosion inhibitor and/or buffer.

* * * * *

UNITED STATES PATENT AND TRADEMARK OFFICE
CERTIFICATE OF CORRECTION

PATENT NO. : 4,584,033
DATED     : April 22, 1986
INVENTOR(S) : Ronald H. Harding and Paul L. Matlock It is certified that error appears in the above-identified patent and that said Letters Patent is hereby corrected as shown below:

At column 7, line 28:  Change "1%" to read --10%--.

Signed and Sealed this

Twenty-ninth Day of July 1986

[SEAL]

Attest:

DONALD J. QUIGG

Attesting Officer

Commissioner of Patents and Trademarks